July 14, 1925.  
F. M. LANDON  
MOWER  
Filed April 2, 1923    2 Sheets-Sheet 2
1,546,088
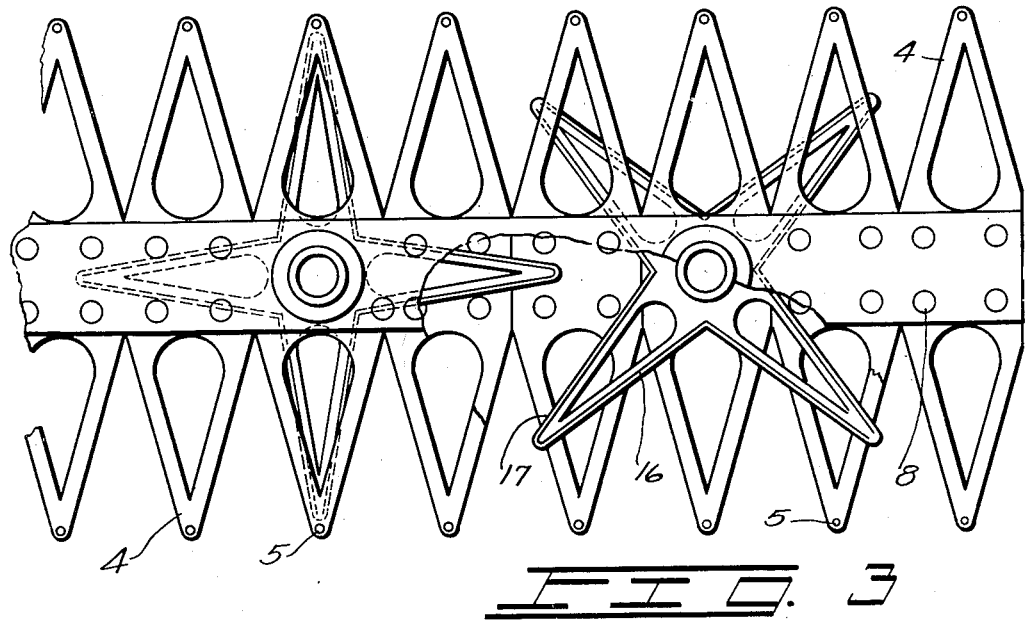
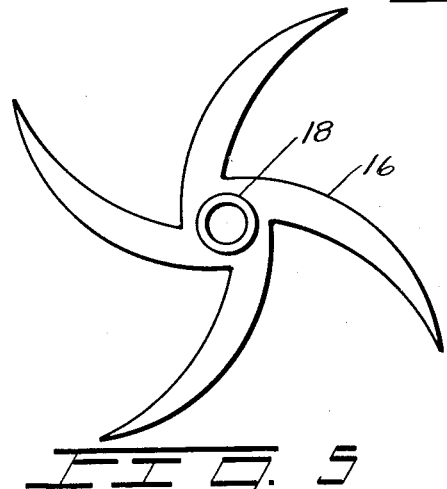
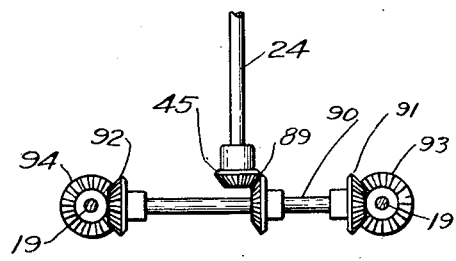
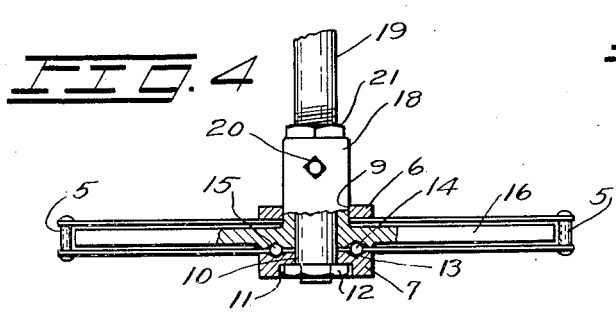
INVENTOR  
*Frederick M. Landon*  
*Harry Bowen*  
ATTORNEY Patented July 14, 1925.

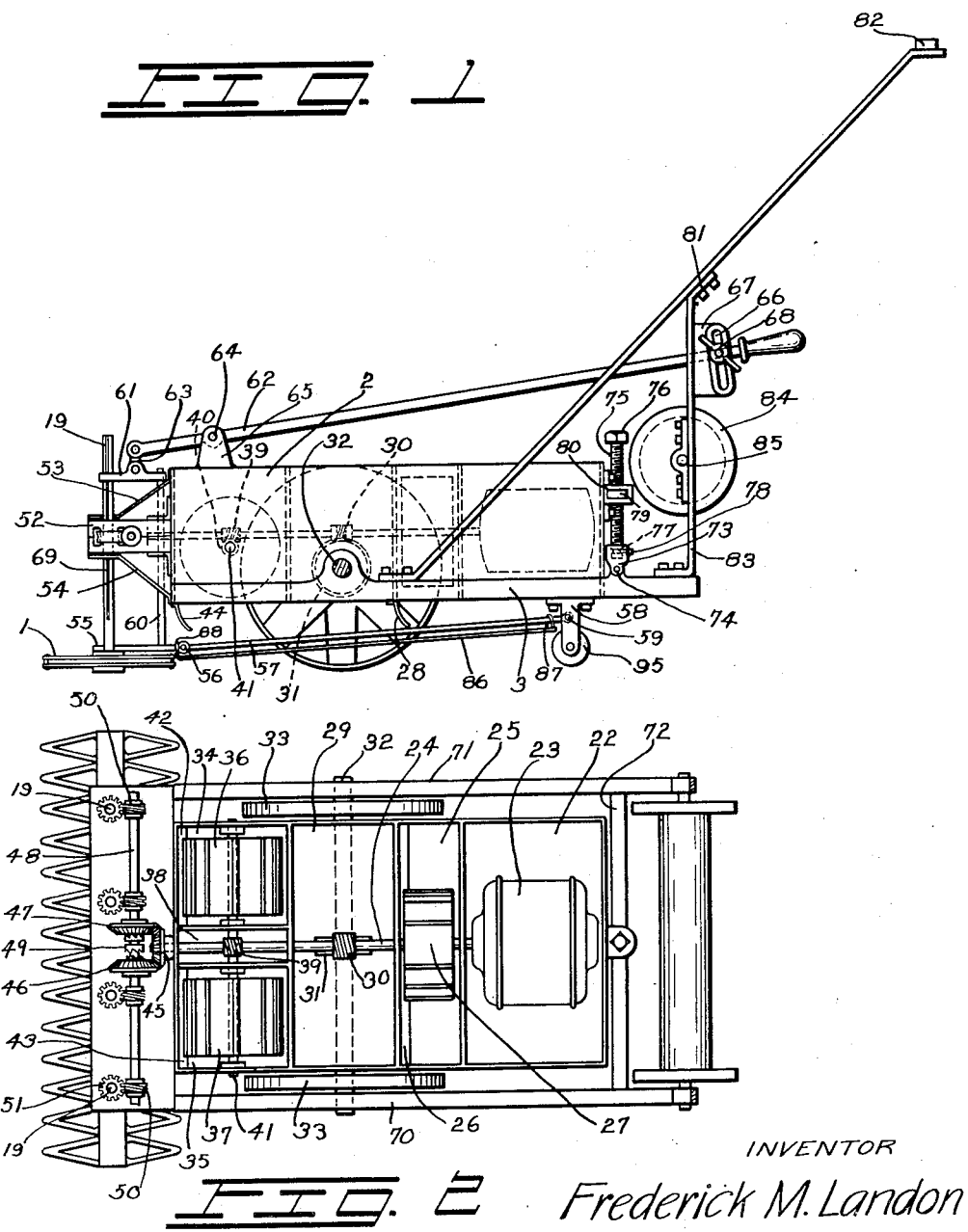

1,546,088

UNITED STATES PATENT OFFICE.

FREDERICK M. LANDON, OF SEATTLE, WASHINGTON.

MOWER.

Application filed April 2, 1923. Serial No. 629,230.

*To all whom it may concern:*

Be it known that I, FREDERICK M. LANDON, a citizen of the United States, residing at Seattle, county of King, and State of Washington, have invented a new and useful Mower; and I do hereby declare that the following is a full, clear, and exact specification, such as will enable others skilled in the art to which it appertains to make and use the same.

The invention is a device for cutting grass, grain, or the like, and is provided with continuously operating cutters which have a rotary motion.

The object of the invention is to provide a mower with horizontal cutting blades that have a continuous rotary motion.

Another object of the invention is to provide a rotary blade for a horizontal cutting bar of a mowing machine.

Another object of the invention is to provide a mower with rotary cutters in a horizontal cutter bar which will cut in either direction.

Another object of the invention is to provide a mower with a horizontal cutter bar having rotary cutters in it with a means for rotating the cutters in either direction.

A further object of the invention is to provide a mower having rotary cutters in a horizontal cutter bar that will cut while the machine is moving either forward or backward with a means for changing the angle of the cutting blade.

And a still further object of the invention is to provide a mower having rotary cutters in a horizontal cutter bar with a means for raising and lowering the cutter bar.

With these ends in view the invention embodies a blade having V shaped guards held by straps with rotary star shaped cutters between the guards, vertical shafts for rotating the cutters, suitable driving means for rotating the cutters in either direction, a suitable housing for holding the driving means and cutting shafts, levers for raising and lowering the cutter bar, a frame with wheels for supporting the housing, a screw for changing the angle of the housing in relation to that of the frame so that the angle of the cutting bar may be changed, a pan under the housing and frame and fans in the housing for blowing the cut particles rearward.

Other features and advantages of the invention will appear from the following description taken in connection with the drawings, wherein:—

Figure 1 is a side elevation with parts omitted.

Figure 2 is a plan view with parts omitted.

Figure 3 is a detail showing the plan of the cutter bar with part broken away.

Figure 4 is a cross section through the cutter bar.

Figure 5 is an alternate design of one of the cutters.

Figure 6 is an alternate arrangement of part of the driving mechanism by which a machine having two cutters may be driven with beveled gears.

In the drawings I have shown my mower as it would appear wherein numeral 1 indicates the cutter bar, numeral 2 the main frame, and numeral 3 the auxiliary frame.

The cutter bar may be constructed of small thin guards 4 which have a flat square section at their centers and taper to points at the ends. The points on the guards are held together by bolts 5 and the guards are held at their centers to a strap 6 on the upper side and a strap 7 on the lower side by bolts or rivets 8. The upper strap 6 may be a straight rectangular shaped piece of material with round holes 9 in it through which the cutter shanks may project. The lower strap 7 may also be a straight rectangular shaped piece of material with holes 10 in it for the cutter shafts and the outer ends of these holes are counter-bored as shown by the numeral 11, thus leaving a space for a nut 12 on the lower end of the shafts. In the upper surface of the strap 7 and around the opening 10 are grooves 13 which form the lower race of the ball thrust bearings 14, the upper race of which is formed by circular grooves 15 in the lower surface of the cutter 16.

The cutters 16 may be made as shown in Figures 3 and 4 with four or any number of points on them and on the sides of these points are beveled surfaces 17 which form the cutting edges; and it will be seen that as there are cutting edges on both sides of the point the cutters will operate in either direction. On the upper sides of the cutters may be shanks 18 through which the cutter shafts may pass. These shanks may be held to the shafts by set screws 20 or in any desired manner. Nuts 21 may be placed on the shafts 19 to form a stop for the shanks and the nuts 12 may be placed on the lower end to hold them in place.

In Figure 5 I have shown an alternate design of the cutters and it will be seen that these cutters may be rotated in a clockwise direction when it is desired to obtain a hook cutting action or they may be rotated in a counter-clockwise direction when it is desired to obtain a shear action. It is also understood that the points of the cutters may be made of any desired shape and as many cutters as may be desired may be used.

The frame 2 may be made of any desired design, however, in this arrangement it is made of a rectangular shape with partitions in it. At the rear end is a compartment 22 in which is a motor 23 which drives the mower and the cutters through a shaft 24. Directly in front of the compartment 22 is a compartment 25 which has an opening 26 in its forward end for permitting air from a fan 27 in the compartment to escape downward, and on the under side of the housing is a baffle plate 28 which guides the air rearward. In front of the compartment 25 is another compartment 29 in which are worm gears 30 and 31 which drive the mower. The worm 30 is fixedly attached to the shaft 24 and this meshes with the gear 31 which is fixedly mounted on the shaft 32 which forms the axle of the wheels 33. This axle is supported in suitable bearings in the side bars of the frame 3. At the forward end of the housing 2 are two compartments 34 and 35 in which are fans 36 and 37 and between these two compartments is a small compartment 38 in which are worm gears 39 and 40. The worm 39 which is fixedly mounted on the shaft 24 drives the gear 40 which is fixedly mounted on a shaft 41 upon which the fans 36 and 37 are also mounted. The air from these fans escapes through openings 42 and 43 in the lower forward corners of the compartments 34 and 35 and is directed rearwardly by a baffle plate 44 on the lower side of the frame.

The forward end of the shaft 24 projects beyond the frame and has a beveled gear 45 on it which meshes with other beveled gears 46 and 47 which are mounted on a shaft 48 and attached to it through a double clutch 49. It will be seen that as this clutch is in engagement with the gear 47 the shaft 48 will rotate in one direction and when it is in engagement with the gear 46 the shaft will rotate in the opposite direction. On this shaft are gears 50 which mesh with other gears 51 on the vertical shaft 19 and thereby rotate these shafts and the cutters. A split housing 52 encloses the gears 50 and 51 and supports the shaft 48 and this housing is attached to the frame 2 in such a manner that it may readily be removed. Above the housing is a plate 53 which forms an oil pocket and below it is a similar plate 54 which also forms an oil pocket so that the gears may work in oil continuously.

On top of the bar 1 are bars 55 which are connected through flexible joints 56 to bars 57 that extend to brackets 58 at the rear of the frame where they are pivoted to them by bolts 59. These bars act as braces to hold the blade 1 forward while it is cutting. Adjacent the rear ends of the bar 55 are vertical bars 60 which extend upward through the housing 52 and have horizontal brackets 61 on their upper ends which are also attached to the upper ends of the vertical shafts 19. These brackets 61 are pivotally attached to levers 62 by links 63 and the levers 62 are pivoted on top of the housing by pins 64 in brackets 65. The bars 62 extend to the rear of the frame and are held in a slotted hole 66 in the brackets 67 by a thumb nut 68; and it will be seen that as the rear ends of the bars 62 are raised or lowered the blade 1 will be raised and lowered through the brackets 61, the vertical bars 60, and the vertical shafts 19. The shafts 19 have slotted keyways 69 in them so that they will continue to rotate as they are raised and lowered.

The auxiliary frame 3 may be constructed as shown with side bars 70 and 71 and a cross bar 72 at the rear in the center of which is a socket 73 which is pivotally attached to it by a pin 74 and extending upward from this socket is a screw 75 with a head 76 on its upper end and a slot 77 in its lower end. A set screw 78 may be placed in the socket 73 to engage the slot 77 so that this end of the screw 75 may be held in the socket as the screw rotates. On the screw is a nut 79 which is held in a bracket 80 on the rear end of the frame 2 and it will be seen that as the screw 75 is turned the rear end of the frame may be raised or lowered.

On the side bars of the frame 3 are handle bars 81 which extend diagonally upward as shown in Figure 1 and on the upper ends of these bars may be a switch box 82 which may be connected to the motor by suitable wires so that the motor may be stopped or started from it, and on vertical supports 83 which extend upward from the rear ends of the side bars a reel 84 may be rotatably mounted in the bearings 85 upon which a long electric cord may be wound. It will be seen that as the mower is moved away from the source of the electric current the cord may be unwound from the reel and it will also be seen that a cord of any desired length may be used.

A pan 86 as shown in Figure 1 may be held below the bars 57 by hooks 87 and 88 and this pan will catch the cut ends of grass or the like and it will be seen that they will be blown toward the rear of the pan by the fans as hereinbefore described.

In Figure 6 I have shown an alternate design of the gears in the center of the front of the machine which arrangement may be used when it is desired to have only two cutters and to have them driven by beveled gears. In this arrangement the shaft 24 has a beveled gear 45 on it similar to that shown in the previous arrangement and this gear meshes with a beveled gear 89 on a shaft 90 which has beveled gears 91 and 92 on each end. The gears 91 and 92 mesh with other gears 93 and 94 which may be mounted on vertical shafts which may be the cutter shafts 19. It will be seen that in this arrangement the vertical shafts 19 may be keyed to the gears 93 and 94 and by extending the keyways in the shafts they may move upward and downward through the gears in order to raise and lower the cutters and bar. This arrangement may also be used with another beveled gear at the center and a clutch between them as shown in the arrangement shown in Figure 2 so that it will be possible to drive the cutters in either direction.

It will be understood that changes may be made in the construction without departing from the spirit of the invention. One of which changes may be in the motive power as it is understood that a steam or gas engine may be used instead of the motor shown or if desired the motive power may be omitted and the cutters operated from the wheels 33 as the device is moved forward or backward. Another change may be in the number of cutters used or in the distance between them. And still another may be in the means for raising and lowering the cutter or for changing the angle as it is understood that any suitable means may be used for either of these operations.

The construction will be readily understood from the foregoing description. To use the device it may be assembled as shown and when in the position shown in Figure 1 it will rest upon the wheels 33 and also the rollers 95 in the brackets 58 at the rear. In this position the cutter blades will be parallel to and close to the ground so that as the machine is started the cutters will rotate and their edges will force the grass or the like against the edges of the guards and shear it. The cut material will fall backward on the pan 86 and be blown toward the rear by the air from the fans. When it is desired to cut a terrace or uneven ground the screw 75 may be turned upward or downward so that the cutter bar may be set at an angle which may correspond to that of the ground to be cut so that it will be possible to obtain an even cut on uneven ground. It will also be seen that the cutter bar may be raised or lowered by the bar 62 so that it will be possible to obtain a close or long cut; and it will also be seen that the cutter bar may be drawn out of the housing 52 from the under side and placed through the upper side so that it may be used to cut the head off of grain or the like instead of cutting it close to the ground.

Having thus fully described the invention what I claim as new and desire to secure by Letters Patent, is:—

1. In a mowing machine, a main frame in which the mechanism is mounted, an auxiliary frame for the main frame, a horizontal cutter bar in the lower forward edge of the main frame, star shaped cutters in the cutter bar, vertical shafts on the lower ends of which the star shaped cutters are mounted, gears on the upper ends of the vertical shafts, other gears which mesh with the gears on the vertical shafts, a horizontal shaft upon which the latter gears are mounted; a longitudinal shaft with means for rotating it; means for rotating the horizontal snaft in either direction by the longitudinal shaft; wheels for supporting the said machine; means for driving the wheels from the longitudinal shaft; fans in the machine behind the cutters; means for rotating the fans from the longitudinal shaft; a pan under the fans for holding material cut by the cutters; and means for raising and lowering the cutter bar.

2. In a mowing machine, a main frame, an auxiliary frame for the main frame, a cutter bar in the main frame, star shaped cutters rotatably mounted in the cutter bar, said cutter bar having guards extending forwardly and rearwardly, vertical shafts upon which the cutters are mounted, means slidably mounted on the vertical shafts by which they may be rotated, a transverse shaft having means engaging said rotating means of the vertical shafts, a longitudinal shaft, means for rotating the transverse shaft in either direction by the longitudinal shaft, a motor for rotating the longitudinal shaft, wheels for supporting the frames, means for driving the wheels from the longitudinal shaft, fans behind the cutters, means for rotating the fans through the longitudinal shaft, and adjustable means for raising and lowering the cutter bar.

FREDERICK M. LANDON.